United States Patent [19]

Baron et al.

[11] Patent Number: 5,511,513
[45] Date of Patent: Apr. 30, 1996

[54] PET LITTER BOX FOR COLLECTING PET WASTE AND ELIMINATION OF ODOR

[76] Inventors: Robert A. Baron, 27 Sunnyside Rd., Scotia, N.Y. 12302-2408; Stanley M. Dzek, 41 Broad St., Kinderhook, N.Y. 12106; Frederick Haber, R.D. Box 138, Howes Rd., Old Chatham, N.Y. 12136

[21] Appl. No.: 377,276

[22] Filed: Jan. 23, 1995

[51] Int. Cl.⁶ .................................................. A01K 1/035
[52] U.S. Cl. ........................... 119/163; 119/165; 119/166
[58] Field of Search ................................... 119/163, 164, 119/165, 166, 168, 169; 55/385.4, 385.8; 131/231, 238

[56] References Cited

U.S. PATENT DOCUMENTS

| | | | |
|---|---|---|---|
| 2,971,493 | 2/1961 | Robb | 119/166 |
| 3,516,232 | 6/1970 | Gilbertson | 55/385 |
| 3,793,989 | 2/1974 | Clark | 119/165 |
| 4,095,559 | 6/1978 | Griffith . | |
| 4,308,825 | 1/1982 | Stepanian . | |
| 4,996,995 | 3/1991 | Kojima | 131/238 |
| 5,140,948 | 8/1992 | Roberts | 119/165 |
| 5,192,342 | 3/1993 | Haber et al. | 55/97 |
| 5,193,488 | 3/1993 | Walton | 119/166 |
| 5,307,761 | 5/1994 | Berger, III et al. | 119/165 |
| 5,315,964 | 5/1994 | Mimms et al. | 119/165 |

FOREIGN PATENT DOCUMENTS 2141613  1/1985  United Kingdom .................. 119/165

*Primary Examiner*—Todd E. Manahan

[57] ABSTRACT

A pet waste material collector and odor eliminator system having in combination a rectangular container, a removable tray insertable in said container which holds litter material and has vents disposed around the upper vertical portions thereof, a filter pack, a fragrance dispenser, and a fan. The tray forms an air chamber between the bottom of the container and the bottom and sides of the removable tray. The fan pulls air and odors across the litter bed material, through the vents of the removable tray into the air chamber, through the air chamber and through a filter pack which absorbs and/or adsorbs the odors. The air is then pulled across an optional fragrance dispenser which masks any residual odors. The litter box also has a motion sensor device which automatically shuts off the fan as the pet approaches the litter box usually about 10 feet from the litter box.

5 Claims, 2 Drawing Sheets

PET LITTER BOX FOR COLLECTING PET WASTE AND ELIMINATION OF ODOR

BACKGROUND OF THE INVENTION

This invention relates to a novel litter box for pets, particularly feline pets, with respect to the elimination of waste and waste odors from household pets.

There are different types of litter boxes for use by household pets ranging from very simple make-shift boxes to sophisticated types which are sometimes impractical. However, the major difficulty with most litter boxes is the elimination of odor, particularly from liquid excretions which are often heavy ammonia odors. Many devices and apparatus are available hopefully to remove, eliminate or mask such odors with some degree of success.

U.S. Pat. No. 5,193,488 describes a system of purification by exposure to an air process or aerification process. The apparatus contains a sand or porous material through which the liquid excretion passes through a top tray, then a previous bottom to said top tray and then dropping onto a suspended porous aeration tablet or pad. The process can also use chemicals implanted in the aeration table.

U.S. Pat. No. 4,308,825 describes a waste odor removing device employing a receptacle, absorbent porous material, a deodorizing absorbent granular material and a screen secured to the receptacle.

U.S. Pat. No. 4,095,559 describes a ventilated litter box which consists of means for exhausting air with the odor from the litter box by exhausting the air with odor to the outside. The device uses a flexible hose connected to a collar around the litter box and a fan at the other end of the hose positioned in an open window to exhaust the litter box odor to the outside atmosphere.

Each of the patented devices described above can be expensive, can require continuing attention or do not fully eliminate the odor from the litter box.

It has now been surprisingly discovered that by employing well known materials in a certain combination, an effective litter box is obtained requiring little attention, eliminates odors emanating from pet waste materials and does not contaminate the atmosphere.

SUMMARY OF THE INVENTION

Briefly, the invention herein is an apparatus for holding pet waste material and the elimination of the strong odors of ammonia that permeate a litter box from use by household pets. The device basically comprises a receptacle, an air cleaner, a filter pack, a fragrance release, an area sensor, a motorized fan and a removable tray. The removable tray contains litter material such as sand, gravel, or preferably marketed litter such as Kitty Litter of other similar products. The tray is easily removed for cleaning purposes or replacing litter material. Preferably, this apparatus is particularly useful for feline pets, namely cats. The object of this invention is to dissipate odors from pet waste deposits particularly liquid excretion. The filter pack is preferably a three (3) part or three (3) stage filter wherein the first part or stage is a porous prefilter which is preferably washable. It may consist of foam polyurethane, fiber glass, corrugated paper or cardboard, and the like. The second part or stage is a high efficiency particulate arrestor (HEPA). Generally such material is very high in efficiency of removing particles from the air like 99.9% efficient. The HEPA material is capable of removing particles as fine as 0.03 um in size. The material is generally woven glass and is available commercially as HEPA. The third part or stage is a mixture of charcoal, zeolite and permanganate hydrasil. The third stage removes odor by adsorption and absorption. While the filter pack employed herein is a three (3) stage filter pack, other filter packs having more than 3 or less than 3 stages may be employed providing the filter pack accomplishes the purpose as described herein. The filter pack removes fine pet hairs that work their way into the air chamber, bacteria that can be on the body of the pet, dander (body flaking) which most pets shed and odor from the pet waste material particularly liquid excretions. Removal of dander and fine hair is important since such materials can be the frequent cause of allergies. The fragrance device also employed herein aides in masking the odor. The fragrance is released as the fan pulls the odors through the filter pack and across the fragrance dispenser. The fragrance employed herein can be any known fragrance but must not be such as to cause the pet to avoid the litter box. Fragrances that can be employed are citrus family fragrances such as lemon, lime, orange, etc., pine scents, and such other fragrances available in the market place. As the fan pulls air with the odors across the fragrance disc, the fragrance will mask the odor and will be dispatched to the air through the exhaust port.

Since household pets are sensitive to noises such as a fan motor when running, the apparatus of this invention also employs a sensor or proximity switch which as the pet approaches the litter box, the sensor will automatically shut off the fan motor. Sensors or proximity switches can generally be adjusted or set for various distances and is preferably set for about 10 feet so that when the pet is within 10 feet of the litter box, the fan motor will shut off. The fan motor is preferably a low volume motor of about 60 CFM (cubic feet per minute). Also, preferably the motor should be contained in a sound-proof chamber in order to reduce the noise level as much as possible even with the shut off motion sensor. An essentially noiseless fan motor may be available and, if so, is preferably employed.

DETAILED DESCRIPTION OF THE DRAWINGS

Figure 1:
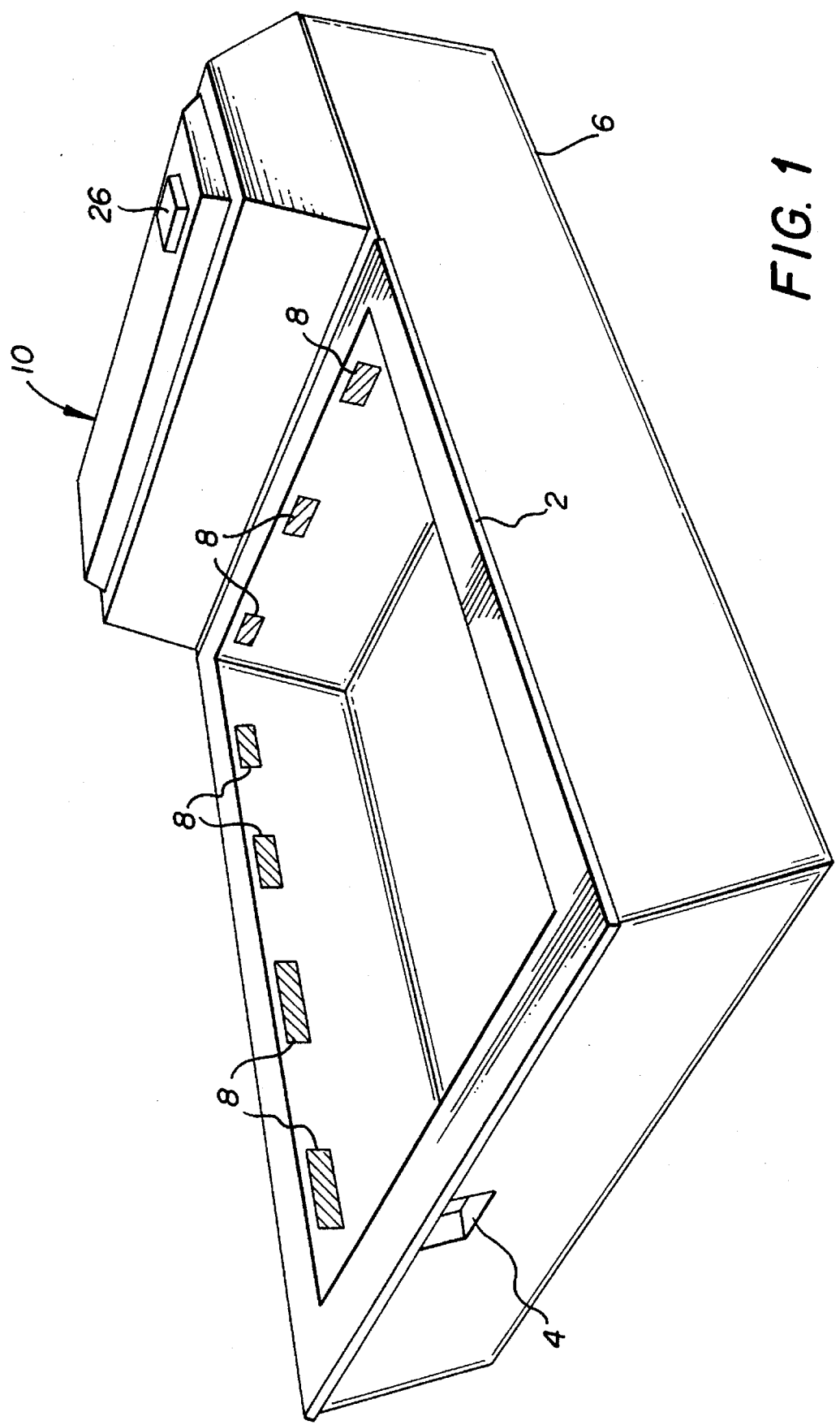
FIG. 1 is a perspective view of the preferred embodiment of the entire assembly of the litter box of this invention.

In FIG. 1 of the perspective view of an embodiment of this invention, container 6 is the entire unit of this invention, and has a removable tray 2, a lift out port 4 for access to lifting out removable tray 2 from container 6, air intake vents 8, filter cover 10 and a proximaty sensor 26.

Figure 2:
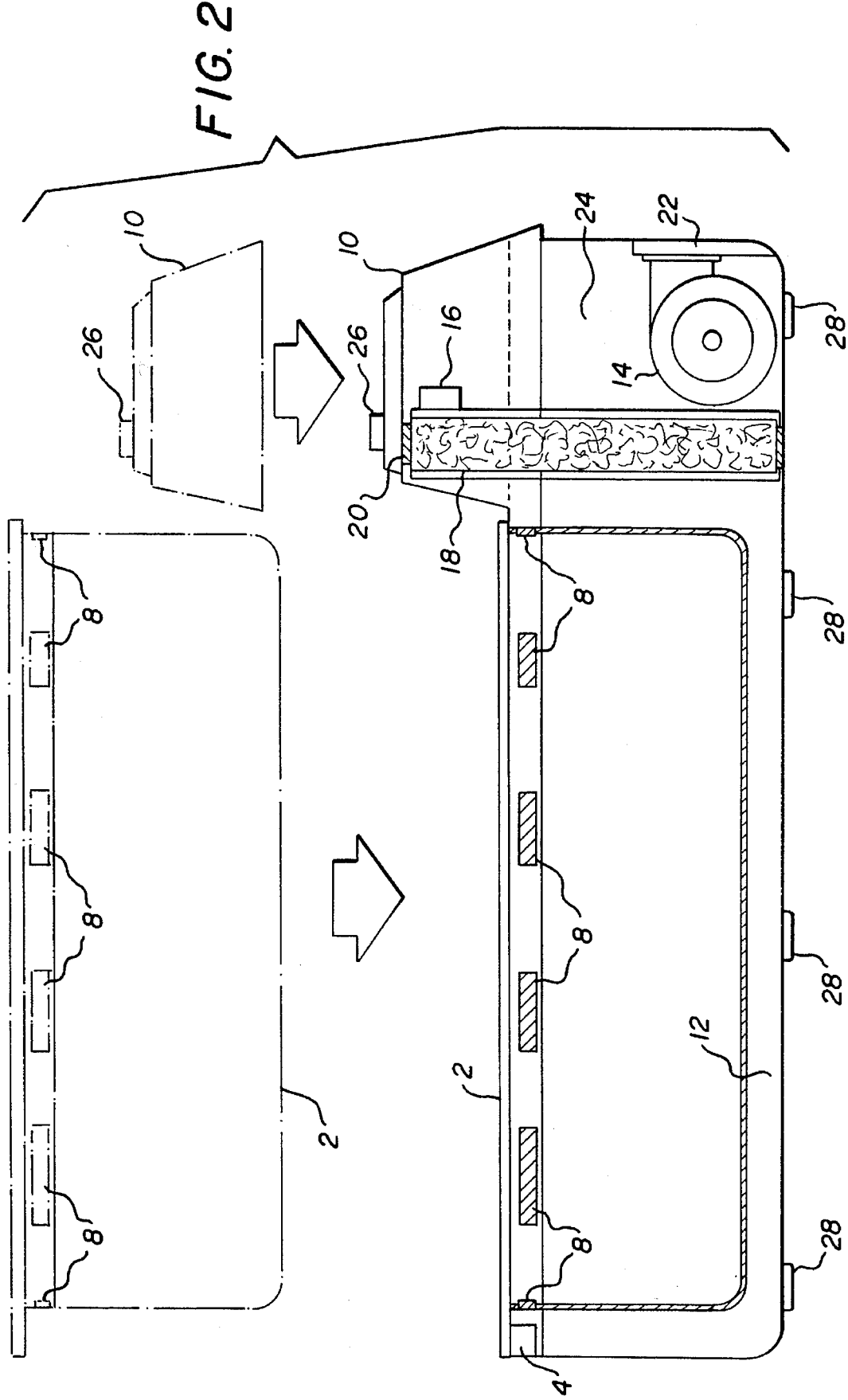
FIG. 2 is a cut away side view of the preferred embodiment of the entire assembly of the litter box of this invention.

FIG. 2 is a cut away side view of the litter box 6 of FIG. 1 showing lift out port 4, removal tray 2 in place with air intake vents 8 which are part of removal tray 2. Vents 8 are generally larger in opening at one end of tray 2 and decrease in opening size toward the opposite end of container 6 where a fan is located (hereinafter described). Generally, the vents are larger in opening farthest from the fan so as to offer the least restriction to the flow of air compared to the smaller vents. Such an arrangement tends to equalize the flow of air over the surface of the litter material in the tray by varying the restriction to the flow of air, thereby ensuring maximum removal of the odors from the surface of the litter into the air chamber and so on to the exhaust port. The vents preferably have fine wire mesh over the opening to prevent large particles of material from flowing into air chamber 12. As pets scratch the litter material, they may throw litter material toward the vents. This prevents litter material or any other large particles from being deposited into air chamber 12 which if they were to get into the filter pack, they could plug the filter pack. While varying size vents are preferred, air intake vents 8 may essentially all be the same size. Litter box or container 6 has air chamber 12 which is formed between the bottom of removal tray 2 and outer shell of container 6. Fan 14, which may be a dual impeller fan, pulls air from the litter tray and from the room in which the litter box is placed, through vents 8 and air chamber 12, through filter pack 18, and across fragrance disc 16. Filter pack seal 20 prevents air with odors and/or particulates from circumventing the filter pack and thus flowing into the atmosphere with the odors and particulates. The residual air is exhausted to the atmosphere through exhaust port 22 which is clean air essentially free of pet excretion odors and pet particulates that find their way into the air chamber. Motor chamber 24 should be as sound proof as possible so as to further reduce the noise level of the fan. Also in order to reduce noise, sensor 26 is employed and will automatically shut off the motor as the pet approaches the litter box. Sensor 26 can usually be set for various distances and is generally set at about 10 feet such that when the pet is within 10 feet of the container, the sensor will shut off the fan motor. By the same token, when the pet leaves the litter box, the fan motor will automatically turn on when the pet is about 10 feet away from the litter box. It is essential that fan noise level be essentially noise free as the pet approaches the litter box. Otherwise, fan noise may cause the pet to avoid the litter box. Optionally, the fan motor may have an overriding manual on-off switch which in the off position will override the sensor device. Filter cover 10 is an easily detachable cover that can be removed for access to the filter pack, fragrance dispenser and fan. FIG. 2 shows the tray and filter cover removed and in place in the container. The container may also have support glides or feet 28 attached to or molded as part of the litter box so that the container may be slightly raised above the floor allowing air circulation under the litter box. The glides or feet are not critical to this invention.

Fragrance discs can be any of the known fragrances and may be either liquid or solid. The fragrance disc aides in deodorizing any residual pet excretion odors while filter pack 18 absorbs the odors from the pet's excretions. Thus, the air with the odor from the pet's excretion particularly liquid excretions is cleansed as it passes through the litter box and is returned to the room as essentially odor and particulate free air.

Optionally, removable tray 2 may have perforations in the bottom threof such that the pet's liquid excretions pass through the litter material to the bottom of container 6. If such is employed, optionally a removable, disposable absorbent pad may be placed on the bottom of container 6 in air chamber 12. The pad may be constructed of paper, plastic, foamed plastic, etc. The absorbent pad provides greater surface area of the liquid excretion and thus faster drying and removal of odors.

Container 6 may be any known material that is essentially liquid proof. Preferably, the litter box is molded from a thermoplastic resin such as, but not limited to, polyethylene, polyphenylene oxide, acrylonitrile-butadiene-styrene (ABS), high impact polystyrene, polycarbonate, polypropylene, polyether imide resins, etc. The litter box may actually be molded out of any thermoplastic resin providing the molded thermoplastic resin is not degraded by the pet's excretions when in contact with the molded container. Also the thermoplastic resin may have filler employed therewith such as glass fibers, mica, carbon fibers or other minerals including known stabilizers.

The size of the litter box may be any convenient size in order to house the elements of the litter box and may be such as about 18 inches long by about 10 inches wide by about 8 inches high, but these dimensions are variable. The motorized fan employed herein may be any conventional fan that will meet the needs of the litter box and may range from about 25 cubic feet of air per minute (CFM) to about 60 CFM or more. Obviously, the larger the fan, the noisier the fan may be and thus other elements of the litter box may need to be adjusted accordingly to compensate therefore such as adjusting the motion sensor switch to shut the motor off at a further distance from the litter box.

Obviously, other modifications and variations of the invention are possible in the light of the above disclosures. It is to be understood, however, that changes may be made in the particular embodiments of this invention so described herein which are within the full intended scope of the invention as defined by the appended claims.

What is claimed is:

1. A pet waste material collector and odor eliminator system comprising in combination:
   (a) a rectangular container;
   (b) a substantially rectangular removable tray having essentially vertical sides and a bottom insertable in said rectangular container which removable tray has air vents along the upper part of the vertical sides of the removable tray, said removable substantially rectangular tray when in place in the container, forms an air chamber between the inside of the bottom of the rectangular container and the bottom and sides of said removable tray;
   (c) a fan;
   (d) a filter pack interposed between said fan and said removable tray and forming one side of said air chamber; and
   (e) a motion sensor for controlling the operation of the fan.

2. The system of claim 1 wherein a fragrance material is interposed between said filter pack and said fan.

3. The system of claim 1 wherein said rectangular container has a lift out port at the end of the rectangular container opposite the filter pack.

4. The system of claim 1 wherein the motion sensor is adjustable for detecting motion from at least 3 feet from the motion sensor.

5. The system of claim 4 wherein the motion sensor can be incrementally set for detecting motion from about 3 feet to about 25 feet from the motion sensor.

* * * * *